2,791,539

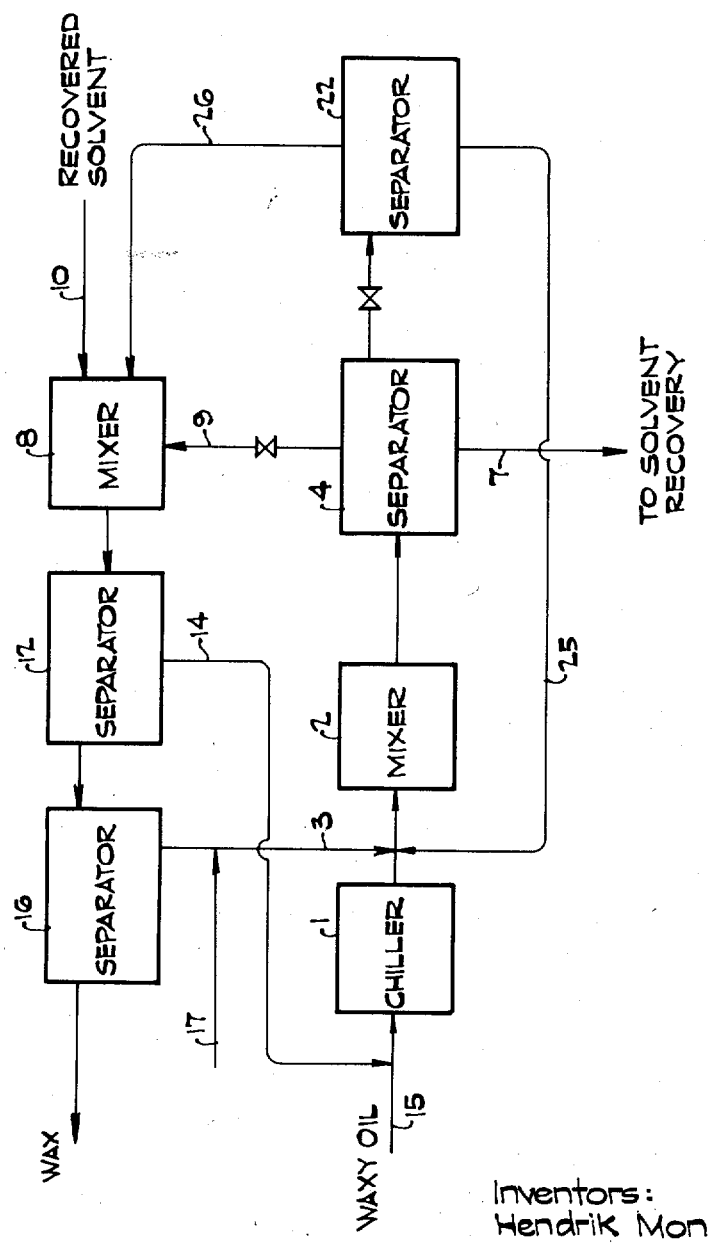

SEPARATING SOLID HYDROCARBONS FROM MIXTURES THEREOF WITH OILS

Hendrik Mondria, Jan Willem Ruwhof, and Eduard Sweep, Amsterdam, Netherlands, assignors to Shell Development Company, Emeryville, Calif., a corporation of Delaware Application December 19, 1951, Serial No. 262,438

Claims priority, application Netherlands December 29, 1950

The portion of the term of the patent subsequent to December 28, 1971, has been disclaimed 6 Claims. (Cl. 196—18)

This invention relates to a process for separating one or more solid hydrocarbons (as well as mixtures of such solid hydrocarbons) from mixtures thereof with oils. More particularly, it relates to a process for dewaxing wax-bearing hydrocarbon oils or fractions thereof.

In the dewaxing of waxy hydrocarbon oils, the greater part of the hydrocarbon wax can be separated by chilling the waxy oil (if desired, in the presence of a suitable solvent, such as methyl isobutyl ketone, propane, or a mixture of $SO_2$ and benzene) to crystallize the wax, and separating the crystallized wax by filtration or centrifuging. However, the separation of the crystallized wax from the oil by filtration is both expensive and technically difficult. Furthermore, the wax thus separated contains appreciable amounts of residual oil even when the filter cake is washed with solvent in the conventional manner. The residual oil is usually removed from the crude wax by sweating, but there are also disadvantages connected with the sweating process. For example, the process requires a prolonged period of time and relatively large apparatus, and the yield is low.

Efforts have been made to effect dewaxing in such a manner as to avoid filtration. Various modifications of the conventional sweating process have also been proposed. For example, it has been proposed to treat a waxy distillate with fuming sulfuric acid to form two phases: an oil phase and an acid sludge containing the paraffin wax. The resulting phases are then separated by decanting. It is also known to treat crude paraffin wax cakes with water to which an aromatic sulfonic acid has been added, and to sweat paraffin wax cakes by contacting with hot solutions of alkali phosphates. Another known method comprises melting a crude wax cake, and then slowly cooling the wax with simultaneous agitation whereby the wax is crystallized in granular form. The wax is separated from the oil on a continuous filter or in a rotary drum. During filtration, a liquid such as water or a water-glass solution is used as a washing liquid.

In general, the proposed processes have been found to be impracticable or uneconomical as it has not been possible to obtain clear-cut separation of oil from wax, and filtration could not be avoided.

The principal object of the present invention is to provide a process for separating solid hydrocarbons from mixtures thereof with oils whereby filtration can be entirely avoided. Another object is to provide a method of dewaxing waxy hydrocarbon oils whereby the hydrocarbon wax particles from the oil phase merge completely into an auxiliary phase which is substantially immiscible with the oil phase. Other objects and advantages will be apparent from the following description.

According to the present invention, it has been found that one or more solid hydrocarbons, particularly hydrocarbon wax, can be separated from mixtures thereof with oils by (a) mixing the initial mixture with an organic solvent which is miscible with the oil but substantially immiscible with the solid hydrocarbon at operating temperatures; (b) chilling, if necessary, to solidify the hydrocarbons; (c) commingling the resulting oil phase containing solid hydrocarbons dispersed therein with an auxiliary liquid which is substantially immiscible therewith and which has a dielectric constant higher than that of the oil phase, and with a surface-active agent (preferably an ionic surface-active agent); and (d) correlating the dielectric constants of the two liquid phases so that the contact angle in the oil phase has a value of at least 90°, preferably 110°, whereby the solid hydrocarbons are preferentially wetted by the auxiliary liquid phase and thereby are transferred thereto. The resulting phases are then separated, and the solid hydrocarbon is or may be then removed from the auxiliary liquid phase.

The contact angle, generally represented by the symbol $\theta$ is the angle which the interfacial tension of the two liquid phases, represented by $\gamma$, forms with the solid hydrocarbon.

The system of the surface-active substance and the two liquid phases is preferably so selected that the absolute value of $\gamma \cos \theta$, which is a measure of the strength that impels the solid hydrocarbon into the auxiliary phase, attains a maximum, which usually occurs when the contact-angle $\theta$ has a value of at least 120° and often of 140–150° or more.

A preferred embodiment of the present invention comprises dewaxing a waxy hydrocarbon oil according to the above-described procedure, separating the oil phase from the hydrocarbon wax-containing auxiliary phase, and washing the wax-containing auxiliary phase with a quantity of oil-miscible organic solvent thereby dissolving any oil which may have remained in an emulsified state in the auxiliary phase. All or a part of the auxiliary liquid can be separated from the wax prior to washing out with solvent. The used solvent may then be recycled for treatment of further portions of wax-bearing oil.

Another preferred embodiment comprises carrying out the above-described dewaxing process in a plurality of stages at successively decreasing temperatures in order to achieve a fractionation of the hydrocarbon wax.

The invention will be better understood from the following detailed description, made with particular reference to the dewaxing of wax-bearing mineral oils.

THE SOLVENT

The organic solvent used should be a good dewaxing solvent, that is, it should be completely miscible with the oil at dewaxing temperatures, but substantially immiscible with the hydrocarbon wax. Suitable dewaxing solvents include halogenated hydrocarbons such as ethylene dichloride, ethylene dibromide, chloroform, carbon tetrachloride, ethyl chloride, propyl chloride, ethyl bromide, propyl bromide, trichloroethane, tetrachloroethane, propylene chloride, trimethylene chloride, amyl bromide, tertiary amyl chloride, butyl chloride, butyl bromide, allyl bromide, beta, beta'-dichlorodiethyl ether, chlorobenzene, bromobenzene, o-dichloro-benzene, tetrachloroethylene, tetrafluoroethylene, 2-chlorophenyl amine, 3-chlorophenylamine, and 1-amino-2-fluorobenzene; aliphatic and aromatic hydrocarbons such as petroleum ether, petroleum naphtha, gasoline, pentane, isopentane, hexane, heptane, octane, benzene, propylbenzene, cumene, amylbenzene, toluene, xylene, and cymene; ketones such as methyl isopropyl ketone, methyl isobutyl ketone, methyl ethyl ketone and mixtures thereof with hydrocarbons such as benzene and/or toluene; and other compounds such as nitrobenzene, furfural, aniline, toluidene, o-aminoethylbenzene, m-aminoethylbenzene, N-methylaniline, N- ethylphenylamine, p-methoxyanilene, 1-ethoxybutane, and methyl phenyl ether; as well as various mixtures thereof, and with other solvents.

The solution of oil in solvent, hereinafter termed the oil phase, must possess a suitble polarity. For the present purpose, this polarity runs almost parallel with the value of the dielectric constant (d. e. c.). With a specific choice of auxiliary phase and surface-active agent, both when the oil phase has a comparatively high d. e. c., and when the oil phase has a low d. e. c., satisfactory results are not obtained. The correct polarity or dielectric constant of the oil phase can be obtained, for example, by applying a mixture of solvents, composed of a solvent with a high d. e. c. and a solvent with a low d. e. c. and by regulating the ratio of the solvents to each other and the ratio of the quantity of the solvent mixture to the quantity of the initial mixture. It often suffices to apply a single polar solvent and make a suitable choice of the ratio of the quantities of solvent to the initial mixture. The foregoing will be illustrated by the following examples.

*Example A*

(a) To a paraffin wax-bearing mineral oil (a strongly aromatic, catalytically cracked oil, which was freed of light components) ethylene dichloride was added as solvent. The mixture was then chilled to 5° C., so that solid paraffin wax formed in the oil phase. Water containing, as a surface-active agent, 50 mg. of sodium heptadecyl-9-sulfate (calculated on 50 cc. water +50 cc. oil phase) was added as the auxiliary liquid. The ratio of oil to ethylene dichloride was varied and the contact angle $\theta$ measured. When this angle $\theta$ was greater than 90°, the solid wax was found to merge into the auxiliary phase, and on the whole, it did so more satisfactorily the more the contact angle exceeded 90° C. When the angle of contact is less than 90° C., the paraffin wax does not merge into the auxiliary phase. The results were as follows:

| Ratio Oil/Solvent in Parts by Volume | Contact Angle $\theta$ |
|---|---|
| 0/100 | 134° |
| 25/75 | 112° |
| 50/50 | 72° |
| 75/25 | 49° |
| 100/0 | 16° |

(b) The same procedure outlined in Example A(a) above was followed, but the ethylene dichloride was partly replaced by furfural, a strongly polar solvent. Fifty-five parts by volume of the solvent mixture were applied to 45 parts by volume of oil. The composition of the solvent mixture was varied and the contact angle $\theta$ was measured. The results were as follows:

| Ethylene Dichloride, Parts by Volume | Furfural, Parts by Volume | Contact Angle $\theta$ |
|---|---|---|
| 54.45 | 0.55 | 42° |
| 53.9 | 1.1 | 17° |
| 52.25 | 2.75 | 5° |

The contact angle had decreased to less than 90°, and the wax no longer merged into the auxiliary phase.

*Example B*

(a) Experiments similar to those described in Example A were performed with a waxy mineral oil distillate having a density $d_4^{70}=0.8053$, a boiling range of 396°–437° C., a pour point of 53° C., a viscosity of 60° C. Redwood I=53.2 and containing 60% solid paraffin wax at 15° C. A mixture of methyl ethyl ketone (MEK) and benzene was used as solvent; 10 cc. of solvent were applied per gram of oil. The surface-active agent used was sodium heptadecyl-9-sulfate in a quantity of 100 mg. per 50 cc. of water (as auxiliary phase) +50 cc. of oil phase. The results were as follows:

| Ratio of MEK/Benzene, Parts by Volume | Contact Angle $\theta$ |
|---|---|
| 60/40 | 76° |
| 50/50 | 88° |
| 40/60 | 115° |
| 30/70 | 157° |
| 20/80 | 150° |
| 10/90 | 90° |
| 5/95 | 78° |

(b) The same procedure was followed as under (a) but a mixture of MEK and toluene was used as solvent. The results were as follows:

| Ratio of MEK/Toluene, Parts by Volume | Contact Angle $\theta$ |
|---|---|
| 50/50 | 74° |
| 40/60 | 90° |
| 30/70 | 130° |
| 20/80 | 145° |
| 10/90 | 98° |
| 5/95 | 83° |

(c) The same oil as described in Example B(a) was treated with gasoline, a non-polar solvent. With a ratio of oil to gasoline of 4 to 50 (weight basis) and with 40 mg. of sodium heptadecyl-9-sulfate per 50 cc. of water +50 cc. of oil phase, a contact angle of $\theta=38°$ was obtained. The wax did not merge into the auxiliary phase.

(d) Methyl isobutyl acetone (MIBK), a strongly polar solvent, was applied as solvent to the oil described in Example B(a). The weight ratio of oil to MIBK was 4 to 50. Water was used as the auxiliary phase, the volume ratio of water to oil phase being 1:1. Various surface-active agents were added and the contact angle $\theta$ was measured. The results were as follows:

| Surface-Active Agent | Contact Angle $\theta$ |
|---|---|
| None | 20° |
| 50 mg. of sodium heptadecyl-9-sulfate+10 mg. MgSO$_4$ | 20° |
| 500 mg. of Breeze [1]+10 mg. MgSO$_4$ | 20° |
| 100 mg. of Breeze [1]+2 mg. MgSO$_4$ | 20° |
| 200 mg. of the sodium salt of the dioctyl ester of sulfo-succinic acid | 30° |

[1] Breeze is a sodium salt of a fatty acid ester of a sulfonated acetamide and has the formula: C$_{11}$H$_{23}$COOCH$_2$CH$_2$NHCOCH$_2$SO$_3$Na.

The results of the various experiments show that the oil phase may not be too strongly or too weakly polar.

THE AUXILIARY LIQUID

The auxiliary liquid should have a higher dielectric constant than the oil phase and should be substantially immiscible therewith. In general, the auxiliary phase should be strongly polar in character. Water, or an aqueous liquid is, therefore, preferred. As a rule, at least 50% of the auxiliary liquid should consist of water. Lower alcohols, glycol or glycerol may be used alone as the auxiliary liquid, but combinations thereof with water are generally preferred.

In order to lower the freezing point of water, salts, such as NaCl or CaCl$_2$, or alcohols, such as methyl or ethyl alcohol or ethylene glycol, can be added. The addition of demulsifying agents is discussed more fully hereinafter.

The auxiliary liquid must be applied in sufficient quantity to enable it to readily absorb the wax particles. The volume ratio of auxiliary liquid to oil phase should be at least 1:1, preferably in the range of from about 1:1 to about 3:1. The auxiliary liquid is generally recirculated.

To obtain a satisfactory separation of the oil phase from the auxiliary phase containing the solid hydrocarbon, the specific gravity of the various phases should be taken into consideration.

As a rule, for effective splitting of the oil phase and the auxiliary phase, it is generally sufficient for them to have a different specific gravity. In principle, therefore, the auxiliary phase may be either lighter or heavier than the oil phase. It will often be necessary, however, to take into consideration the specific gravity of the solid hydrocarbon. The specific gravity of the phases is preferably adjusted (by an effective choice of the various liquids) so that the specific gravity of the auxiliary phase lies between that of the oil phase and that of the solid hydrocarbon. Although, strictly speaking, this is not necessary, it is very desirable, as otherwise the solid hydrocarbon accumulates in the neighborhood and on the interfacial surface of the two liquid phases, thereby making the separation more difficult.

Further details will be given, taking as basis the separation of oil from paraffin wax.

As a rule, paraffin wax has a specific gravity slightly higher than that of the oil in which it is present; for example, the specific gravity of paraffin wax can amount to 0.95 and the specific gravity of the oil to 0.9. Very effective separation can now be obtained by adding to the oil a relatively heavy solvent, such as ethylene dichloride or dichloromethane, so that the specific gravity of the oil phase becomes greater than 1. Water can be used, for instance, as auxiliary phase, and Na-heptadecyl-9-sulphate as surface-active substance. In this case the paraffin wax will float on the water phase, while the oil phase will form the lowest phase. There is then no difficulty whatsoever attached to separation of the phases.

It is, however, also possible to add to the oil a relatively light solvent, for example, a mixture of methyl ethyl ketone, propane and possibly benzene, so that the specific gravity of the oil phase becomes relatively low. A mixture of water and methanol or ethanol, the specific gravity of which is lower than that of the paraffin wax, but higher than that of the oil phase, can be used as auxiliary phase. In this case, the paraffin wax settles out, while the oil phase floats on the water phase. The first method is to be preferred, however, as in practice it allows greater freedom of action.

The separation of hydrocarbon wax from auxiliary liquid presents no difficulties. The separation is effected preferably by heating the wax-containing auxiliary liquid to an elevated temperature, e. g., about 70° C., thereby forming two immiscible liquids which can easily be separated from each other. It is preferred to remove a major proportion, e. g., from about 50% to about 80%, preferably from about 55% to about 75%, of the auxiliary liquid, e. g., by crude filtration or by decanting, prior to the heating step in order to reduce the heating requirements of the system. Furthermore, by removing a major portion of the auxiliary liquid prior to heating, a portion of the oil which remains entrained in the auxiliary phase is also removed, and a hydrocarbon wax of decreased oil content is thus obtained. Conventional methods for separating solids from liquids, such as filtration and centrifuging, may also be employed for the removal of the wax from the auxiliary liquid.

THE SURFACE-ACTIVE AGENT

The surface-active agent must be selected so that, together with the correct adjustment of the dielectric constants of the two liquid phases, the contact angle $\theta$ is greater than 90°. The surface-active agent may be added to either the oil phase or the auxiliary liquid. It is preferred that the surface-active agent be soluble in the auxiliary phase since the auxiliary phase is generally recirculated. Thus, consumption of the surface-active agent is minimized.

Either anionic or cationic surface-active agents can be used. Preferred surface-active agents are those which contain one or more alkyl radicals having at least 8 carbon atoms connected to a strongly polar group.

Anionic type surface-active agents are represented by the aliphatic and aromatic sulfates and sulfonates, particularly alkylated aromatic sulfonates. Specific examples include the alkali metal, particularly sodium salts of: dioctybenzene sulfonic acid, the dioctyl ester of sulfosuccinic acid, an alkylated aryl polyether sulfate, a fatty acid ester of sulfoacetamide, a sulfonated fatty acid amide, a mixture of dibutylnaphthalene sulfonic acid and diisopropylnaphthalene sulfonic acid, dodecylbenzene sulfonic acid, mixtures of $C_9$—$C_{13}$-benzene sulfonic acids, heptadecyl-9-sulfate and tricosanyl-12-sulfate.

Suitable cationic surface-active agents include the quaternary ammonium halides, such as stearyl dimethyl benzyl ammonium chloride.

Certain cationic agents, such as octadecylamine and dodecylamine are not sufficiently polar to dissolve in the auxiliary liquid. By adding an acid, e. g., HCl, whereby the corresponding amine hydrochloride is formed, satisfactory results are obtained. It is preferred to add the amine to the oil phase and the acid to the auxiliary liquid.

A similar situation arises with certain anionic agents, such as oleic acid, ricinoleic acid, sulfonated ricinoleic acid ester, sulfonated fatty acid esters and various naphthenic acids. Positive results can be obtained with these agents by the addition of NaOH, preferably to the auxiliary liquid.

The surface-active agent may be employed in the range of from about 0.01% to about 5%, preferably from about 0.02% to about 2%, based on the auxiliary liquid.

Owing to the presence of the surface-active agent, the various interfacial tensions have become so small that the formation of emulsions can be expected in many cases. The formation of emulsions is in itself not a disadvantage as it causes intimate contact between the water and oil phases. For the subsequent separation of the solid phase and the separation of the liquid phase from each other, it is, however, necessary that no stable emulsions are formed.

It has been found that the addition of a demulsifier will prevent the formation of persistent emulsion without harming the activity of the surface-active agent.

When using an anionic surface-active agent, cationic demulsifiers are generally used. Suitable cationic demulsifiers are salts of polyvalent metal, preferably bivalent metals, e. g., $MgSO_4$, $MgCl_2$, $CaCl_2$, $CaSO_4$, $Ni(NO_3)_2$, $Zn(NO_3)_2$, $FeSO_4$, $CuSO_4$, $CdCl_2$ and $MnSO_4$. Certain monovalent metal salts, such as the lithium and ammonium salts can be used, for example, LiCl and $NH_4Cl$.

When using a cationic surface-active agent, an anionic demulsifier should be used. Preferred anionic demulsifiers are salts of monovalent cations and polyvalent anions, such as, $Na_2SO_3$, $K_2CrO_4$, $Na_4P_2O_7$, $Na_2SO_4$, $Na_2CO_3$, $K_2CO_3$, $K_2S$, $Na_2S_2O_3$, and $NaNO_2$.

Organic demulsifiers were found to produce no results by themselves, but were found to be active when used together with a salt such as sodium sulfate. Suitable organic demulsifiers include cyclohexylamine, phenol, diphenylamine, amyl alcohol, dodecyl alcohol, and cyclohexanol. Non-ionic surface-active agents were also active as demulsifiers when used with sodium sulfate. Representative non-ionic surface-active agents include esters and ethers of polyhydroxy alcohols, particularly polyglycols, e. g., the monostearate and monoleate of polyethylene glycol, polyoxyethylene derivatives of alkyl phenols, and polyoxyethylene derivatives of sorbitol esters of fatty acids.

The demulsifier may be employed in the range of about 0.0005% to about 1% by weight, based on the auxiliary liquid. The demulsifier used must not, of course, precipitate the surface-active agent.

In the presence of a demulsifier, the contact of the phases can be promoted by vigorous stirring. This procedure is preferred since the paraffin wax particles become separated from each other and are more intimately contacted with the surface-active agent thereby preventing inclusion of oil. Furthermore, the paraffin wax particles are more rapidly transferred to the auxiliary phase.

When a demulsifier is present in the system, the surface-active agent can be added to the auxiliary liquid only.

The following examples illustrate procedures for dewaxing waxy hydrocarbon oils in accordance with the present invention.

*Example I*

A. 100 parts by weight of a waxy mineral oil distillate having the following characteristics: 60% solid paraffin wax at 15° C., density $d_4^{70}=0.8053$, boiling range of 396°–437° C., pour point=53° C.; viscosity at 60° C., Redwood I=53.2, was diluted at 70° C. with 750 parts by weight of ethylene dichloride. The mixture was slowly cooled to 15° C. with moderate stirring to crystallize out solid paraffin wax. The resulting mixture was stirred to an emulsion with 1000 parts by weight of water which was chilled to 15° C. and which contained 0.25 part by weight of sodium heptadecyl-9-sulfate and 0.02 part by weight of $MgSO_4$. The mixture was settled, with very gentle stirring, at 15° C. for three minutes. The water phase containing the solid wax was separated from the wax-free oil phase. The separated water phase was heated to 70° C. The melted wax layer was removed from the water layer. The wax obtained contained 0.52% by weight of oil (ASTM Method D 721) and had a melting point of 60° C. The yield of wax, based on the initial oil, was 60%.

B. The same procedure was followed as under A, but 1 part by weight of $Na_2SO_4$ and 1 part by weight of cyclohexanol were substituted for the $MgSO_4$. The wax obtained had an oil content of 0.41%.

*Example II*

The same procedure was followed as under Example I(A), except that, after separating the oil phase from the wax-containing water phase, the water phase was allowed to settle for one hour, without heating, 550 parts by weight of water were decanted. The remaining mixture was heated to 70° C. The liquid wax was then removed from the water. The paraffin wax had an oil content of 0.23%.

*Example III*

The same procedure was followed as under Example II, but after decanting the 550 parts by weight of water, the remaining wax-water phase was filtered. The oil content of the wax obtained was less than 0.1%.

*Example IV*

The same procedure was followed as under Example I, above, but with the modified quantities given below 100 parts by weight of waxy oil was used in each case.

A

|  | Parts by weight |
|---|---|
| Ethylene dichloride | 750 |
| Water | 1500 |
| Sodium heptadecyl-9-sulfate | 0.375 |
| $MgSO_4$ | 0.04 |

The paraffin wax obtained had an oil content of 0.54%.

B

|  | Parts by weight |
|---|---|
| Ethylene dichloride | 750 |
| Water | 1500 |
| Sodium heptadecyl-9-sulfate | 0.375 |
| $Na_2SO_4$ | 1.5 |
| Cyclohexanol | 1.5 |

The resulting paraffin wax had an oil content of 0.31%.

C

|  | Parts by weight |
|---|---|
| Ethylene dichloride | 300 |
| Water | 1500 |
| Na-heptadecyl-9-sulfate | 0.375 |
| $MgSO_4$ | 0.03 |

The result was a paraffin wax with an oil content of 1.42%.

D

|  | Parts by weight |
|---|---|
| Ethylene dichloride | 300 |
| Water | 1500 |
| Na-heptadecyl-9-sulfate | 0.375 |
| $Na_2SO_4$ | 1 |
| Cyclohexanol | 1 |

The result was a paraffin wax with an oil content of 0.96%.

E

|  | Parts by weight |
|---|---|
| Ethylene dichloride | 300 |
| Water | 1000 |
| Na-heptadecyl-9-sulfate | 0.25 |
| $MgSO_4$ | 0.02 |

The result was a paraffin wax with an oil content of 2.26%.

F

|  | Parts by weight |
|---|---|
| Ethylene dichloride | 300 |
| Water | 1000 |
| Na-heptadecyl-9-sulfate | 0.25 |
| $Na_2SO_4$ | 1 |
| Cyclohexanol | 1 |

A preferred process for dewaxing hydrocarbon oils according to the present invention is a continuous process in which the separated wax-containing aqueous phase is washed out with recovered solvent. This embodiment of the present invention will be better understood by reference to the accompanying drawing which shows a schematic flow diagram of a continuous dewaxing process.

Referring to said drawing, a mixture of a waxy hydrocarbon oil and an organic oil-miscible solvent is cooled in chiller 1 to solidify hydrocarbon wax. The chilled mixture is charged to a first mixer 2 where it is mixed with chilled aqueous liquid containing an ionic surface-active agent and a demulsifier, which aqueous liquid is passed to mixer 2 via line 3. The resulting mixture of oil phase and wax-containing aqueous phase is passed to a first separator 4 wherein the separation of the phase is effected. The separated oil phase is transferred to a solvent recovery zone, such as a distillation zone (not shown) for removal of solvent from dewaxed oil. The separated wax-containing aqueous phase is transferred to a second mixer 8 via line 9 wherein it is mixed with recovered solvent which is introduced into mixer 8 through line 10. The resulting mixture is passed to a second separator 12 for separation of a solvent phase from a wax-containing aqueous phase. The separated solvent phase is transferred through line 14 into line 15 for admixture with incoming waxy hydrocarbon oil. The separated wax-containing aqueous phase is charged to a third separator 16 for recovery of wax from the aqueous phase. The separated aqueous phase (after chilling, if necessary) which contains the surface-active agent and the demulsifier is returned to mixer via line 3. Make-up surface-active agent and demulsifier are introduced through line 17 into the recycle aqueous stream. Make-up solvent may be added to the system as needed.

It is preferred to remove a major proportion of the aqueous liquid from the wax-containing aqueous phase prior to washing with recovered solvent in mixing zone 8. This can be accomplished by passing the separated wax-containing aqueous phase from separator 4 to separator 22 for removal of a major portion of aqueous liquid, e. g., by decantation or crude filtration. The separated aqueous liquid is returned to the system via line 25. The wax-containing aqueous phase having a reduced aqueous liquid content is transferred through line 26 to mixing zone 8 for treatment with recovered solvent as described above.

The following examples are illustrative of the above-described embodiment of the present invention.

*Example V*

100 parts by weight of a strongly aromatic, catalytically cracked oil, freed of light components, was mixed with 150 parts by weight of ethylene dichloride. The mixture was cooled to 5° C. to solidify hydrocarbon wax. The resulting mixture was contacted, at 5° C., with an auxiliary phase comprising 150 parts by weight of water, 0.25 part by weight of sodium heptadecyl-9-sulfate and 0.015 part by weight of $MgSO_4$. The mixture was allowed to settle and the oil phase was separated from the wax-containing aqueous phase. The wax-containing aqueous phase was then washed with 50 parts by weight of ethylene dichloride. The solvent phase was then separated from the wax-containing aqueous phase, and the wax was recovered from the aqueous phase. The recovered wax had an oil content of 1.03%.

*Example VI*

A. The waxy mineral oil described in Example I(A), above, was treated according to the above-outlined continuous process. 100 parts by weight of oil were mixed with 300 parts by weight of ethylene dichloride. The chilled mixture was chilled to about 15° C. The chilled mixture was mixed with 1000 parts by weight of water, 0.25 part by weight of sodium heptadecyl-9-sulfate and 0.02 part by weight of $MgSO_4$. The mixture was then processed to separate an oil phase from a wax-containing aqueous phase. The separated wax-containing aqueous phase was washed with the total amount of ethylene dichloride recovered from the oil phase. A solvent phase was separated from a wax-containing aqueous phase and was recycled. Wax was recovered from the aqueous phase which was then recirculated. In order to maintain the concentration of surface-active agent and demulsifier, 0.06 part by weight of sodium heptadecyl-9-sulfate and 0.01 part by weight of $MgSO_4$ were added to the recirculating aqueous stream. The wax obtained had an oil content of 0.23%.

B. The same procedure was followed as under Example VIII(A), except that about 650 parts by weight of water was removed from the wax-containing aqueous phase prior to washing out with recovered ethylene dichloride. The wax obtained had an oil content of 0.12%.

By crystallizing the wax in a number of stages at successively decreasing temperatures, a fractionation of the wax can be achieved, as illustrated in the following example:

*Example VII*

300 parts by weight of ethylene dichloride were mixed at 70° C. with 100 parts by weight of the waxy distillate used in Example I. The mixture was slowly cooled to 39° C. At this temperature 350 parts by weight of water containing dissolved therein 0.165 part by weight of a mixture of Na—$C_9$—$C_{13}$-benzene sulfonates and 0.023 part by weight of $MgSO_4$ were added. The resulting mixture was stirred vigorously for half a minute; then allowed to settle for five minutes with gentle stirring. The oil phase was then separated from the water-wax phase. The water-wax phase was heated and liquid wax was recovered.

The oil phase was then further cooled to 36° C. and then contacted with the same amount of water, surface-active agent and demulsifier as above. Wax was recovered from the water phase.

The process was repeated at 20° C. The wax obtained in the three stages had the following properties:

| Melting Point | Index Refraction | Yield (Based on Initial Oil), percent |
|---|---|---|
| 60.5° C. | 1.4333 | 15 |
| 59.5° C. | 1.4330 | 26.5 |
| 58.5° C. | 1.4322 | 18.5 |

The hydrocarbon wax-containing auxiliary liquid phase, obtained by any of the foregoing methods, can be treated with a small proportion of a dewaxing solvent, e. g., about 10% to about 50%, by weight of the solvent used in the treatment of incoming waxy hydrocarbon oil, at a temperature of about 20° C. to about 45° C., preferably from about 25° C. to about 35° C. in order to separate low melting components, called soft wax, from solid, hard wax. A solvent phase containing said low melting components can then be separated from the solid hydrocarbon wax-containing auxiliary liquid phase. The auxiliary liquid phase is preferably recirculated, and the solvent phase is preferably removed from the system. If desired, the solvent can be separated from the low melting components phase and returned to the process.

Other modifications of the present invention can readily be seen from the foregoing description. For example, a portion of the oil phase can be separated from solidified hydrocarbon wax prior to contact with the auxiliary liquid. If desired, substantially all of the oil phase can be separated by filtration and the resulting wax cake can be washed with the auxiliary liquid. When deoiling wax cakes, however, it is necessary that the surface-active agent be added to the mixture of oil phase and solidified wax prior to filtration.

It is to be understood that the waxy oil and the solvent can be chilled to dewaxing temperatures, either separately or in admixture, prior to contact with the auxiliary phase. Moreover, the auxiliary phase can be mixed with the oil phase prior to chilling.

Although the invention has been described in detail with respect to the dewaxing of hydrocarbon oils, it is likewise applicable to the separation of other solid hydrocarbons from oils, e. g. the separation of solid naphthalene from tar oil and the separation of solid fractions from kerosene.

The value of the dielectric constant of the solvent containing oil phase lies preferably between about 2 and about 15; the best results are usually obtained with values between about 3 and 10.

It is generally of importance to establish the pH value of the liquid auxiliary phase at a suitable value, for the pH value of the auxiliary phase is often found to influence the value of the contact angle $\theta$ and in consequence thereof the transfer of the solid hydrocarbon, for example paraffin wax, from the oil phase to the auxiliary phase. As a rule the value of the contact angle $\theta$ increases according as the value of the pH of the auxiliary phase increases. In this connection the pH of the auxiliary phase is usually selected greater than 7.

Moreover, when an aqueous auxiliary phase comes into intimate contact with the oil phase a higher pH value (pH>7) promotes the formation of a temporary) oil-in-water emulsion, instead of a water-in-oil emulsion, which is generally desirable. The pH value of the auxiliary phase can, for example, be adjusted by the addition of a quantity of a basic reacting substance such as a NaOH solution.

It is advisable to render innocuous those substances present in the oil which can be expected to adsorb on to the solid hydrocarbon and thereby decrease the activity of the surface-active substance (naphthenic acids, asphaltenes and the like), for example, by removing them from the oil beforehand, by precipitating them during the process or by converting them into compounds which dissolve better in the auxiliary phase than in the oil phase.

The solid hydrocarbon containing oil phase and the auxiliary phase may also be contacted with each other by discharging the one phase through a distributing device into the other phase. As a rule it is advisable to have the auxiliary phase act as the relatively light, continuous phase.

We claim as our invention:

1. In a method of dewaxing a waxy mineral oil, the combination of steps comprising: (1) mixing the waxy mineral oil with a substantial proportion of a dewaxing solvent which is a solvent for the mineral oil but which is substantially a non-solvent for solid wax at dewaxing temperature, and adjusting the temperature of the mixture to obtain a single liquid phase solution of the solvent, oil and wax; (2) cooling the solution to a dewaxing temperature at which the wax solidifies, thereby forming a dispersion of solid wax particles in a liquid oil phase which is a solution of the oil and the solvent; (3) commingling the resulting dispersion of solid wax dispersed in the oil phase with a substantial proportion, at least equal in volume to the volume of the oil phase, of a substantially polar auxiliary liquid which is substantially immiscible therewith and which has a dielectric constant higher than that of the oil phase, the auxiliary liquid being essentially at the dewaxing temperature, and with from 0.01 to 5% by weight, based on the auxiliary liquid, of a surface-active agent, whereby two liquid phases result, an oil phase consisting essentially of mineral oil and solvent and an auxiliary liquid phase containing dissolved surface-active agent, and correlating the dielectric constants of the two liquid phases so that the contact angle in the oil phase is at least 90°, whereby the solid wax is preferentially wetted by the auxiliary liquid phase and is transferred thereto to produce a dispersion of the solid wax in the auxiliary liquid phase as continuous phase, while the oil phase is substantially freed from solid wax; (4) stratifying and separating the oil phase from the auxiliary liquid phase containing the dispersion of solid wax; (5) removing a major proportion of the auxiliary liquid from said wax-containing auxiliary liquid phase thereby removing a portion of oil phase entrained therein; and recovering the wax from the remainder of the auxiliary liquid containing the wax dispersed therein.

2. A process according to claim 1, wherein the surface-active agent is an anionic surface-active agent having at least one alkyl group having at least 8 carbon atoms attached to a polar group.

3. A process according to claim 2, wherein the dewaxing solvent is a halogenated hydrocarbon.

4. A process according to claim 2, wherein the dewaxing solvent is at least 3 parts by weight of ethylene dichloride, based on the waxy oil, wherein the surface-active agent is sodium heptadecyl-9-sulfate, and wherein the auxiliary liquid contains a demulsifying amount of magnesium sulfate.

5. A process according to claim 1, wherein the remainder of wax-containing aqueous phase separated in step (5) thereof is washed with an additional amount of the dewaxing solvent thereby substantially removing remaining oil entrained in the wax-containing aqueous liquid phase.

6. A process according to claim 5, wherein the wash solvent resulting from the washing of the remainder of wax-containing aqueous phase separated in step (5) thereof is recycled for treatment of further portions of waxy mineral oil in step (1) thereof.

References Cited in the file of this patent
UNITED STATES PATENTS

| | | |
|---|---|---|
| 1,937,518 | Henderson et al. | Dec. 5, 1933 |
| 2,164,013 | Jenkins | June 27, 1939 |
| 2,168,140 | Schutte | Aug. 1, 1939 |
| 2,263,535 | Carr et al. | Nov. 18, 1941 |
| 2,645,597 | Myers et al. | July 14, 1953 |
| 2,698,279 | Mondria | Dec. 28, 1954 |

OTHER REFERENCES

Berkman and Egloff: "Emulsion and Foams," pp. 285–292. Pub. by Reinhold Pub. Co., New York, 1941.